United States Patent [19]

Masao

[11] Patent Number: 5,052,912
[45] Date of Patent: Oct. 1, 1991

[54] PELLET PRODUCTION APPARATUS

[76] Inventor: Moriyama Masao, 508-13, Tendocho 17, Nishinomiya, Hyogo, 663, Japan

[21] Appl. No.: 339,174

[22] Filed: Apr. 14, 1989

[30] Foreign Application Priority Data

Oct. 23, 1987 [JP] Japan ................ 62-268497

[51] Int. Cl.⁵ .............................................. B29B 9/10
[52] U.S. Cl. .................................... 425/313; 264/142;
425/310; 425/311; 425/437; 425/DIG. 230
[58] Field of Search .................... 264/142, 140;
425/DIG. 230, 308, 309, 310, 311, 313, 236,
237, 437

[56] References Cited

U.S. PATENT DOCUMENTS

| | | | |
|---|---|---|---|
| 2,497,212 | 2/1950 | Donofrio | 425/237 |
| 2,525,135 | 10/1950 | Huff | 425/437 |
| 2,775,788 | 1/1957 | Andrew | 264/142 |
| 3,271,820 | 9/1966 | Hendry | 425/437 |
| 3,355,765 | 12/1967 | Hendry | 425/437 |
| 4,316,708 | 2/1982 | Skach et al. | 425/437 |
| 4,465,451 | 8/1984 | Adderley, Jr. | 264/142 |
| 4,582,473 | 4/1986 | Rizzi et al. | 425/225 |

FOREIGN PATENT DOCUMENTS

| | | | |
|---|---|---|---|
| 55-1166 | 1/1980 | Japan . | |
| 56-12490 | 3/1981 | Japan . | |
| 56-148511 | 11/1981 | Japan | 264/142 |
| 820729 | 9/1959 | United Kingdom | 425/225 |

Primary Examiner—Jay H. Woo
Assistant Examiner—James P. Mackey
Attorney, Agent, or Firm—Koda and Androlia

[57] ABSTRACT

A pellet production apparatus to be incorporated with an extruder for mass-producing pellets of plastics or the like. The apparatus includes a multi-perforated hollow cylindrical sheath acting as nozzles and a cylindrical rotor provided on its cylindrical surface with some lengthwise tapered-grooves and corresponding lengthwise ridge portions. The ridge portions act as cutters with the rotor rotatably inserted in the sheath. The rotor is further provided with an air blower for blowing compressed air radially and rotated by a driver exclusive to the rotor. A pellet material extruded from the extruder into the present apparatus is made to proceed along the grooves of the rotor, pushed out from the perforations of the sheath and then cut out into pellets by the ridge portions of the rotor as it rotates further. The thus produced pellets, which are apt to stick to the perforations, are blown off by the compressed air.

1 Claim, 2 Drawing Sheets

PELLET PRODUCTION APPARATUS

BACKGROUND OF THE INVENTION

The present invention relates to an apparatus for producing pellets of plastic, rubber, ceramic, a composite of them or the like.

The inventor of the present invention has disclosed two kinds of pellet production apparatus in Japanese Patent Publication Nos. 55-1166 and 56-12490.

The apparatus disclosed in the Publication No. 55-1166 is basically made up of a combination of an ordinary screw type extruder with a specifically designed pellet forming device. The pellet forming device is composed of a stationary cylindrical sheath member formed by a hollow cylinder having on its cylindrical surface many orifices as nozzles and of a grooved cylindrical rotor formed by a cylinder having on its cylindrical surface some lengthwise grooves and corresponding lengthwise ridge portions. The grooved cylindrical rotor, being inset in the stationary cylindrical sheath member, is sized so that the lengthwise ridge portions may rotatably be fitted to the inner surface of the stationary cylindrical sheath member. The thus constituted pellet forming device is attached to the extruding end of an screw type extruder with said stationary sheath member fixed to the body of the extruder and with said grooved rotor coaxially connected with the screw part of the extruder. In such an entire constitution of the apparatus, a pellet material extruded into the pellet forming device from the extruder is pushed out from the orifices of the sheath member through the grooves of the rotor, and then cut off by the ridge portions of the rotor as it rotates together with the screw of the extruder. Thus, many pellets can be produced at a time and continually.

However, this apparatus has proved to have a disadvantage that the length of produced pellets is not determined only by the mechanical structure of the pellet forming device, but largely influenced by the inner pressure and screw rotation speed of the extruder or the viscosity of the material.

The apparatus, which is disclosed in another Publication No. 56-12490, is an extruder whose extrusion end comprises many extrusion nozzles and a cutter or cutters. According to this apparatus, a plurality of continuously extruded cord-like pellet materials are cut into pellets by the cutter or cutters.

A decisive disadvantage of this apparatus is that the productivity is low owing to the use of a cutter or cutters, especially in producing such small pellets as are, for example, 1.5 mm in diameter and 2 mm in length. Application of this apparatus is limited because of a recently increasing demand for such small-sized pellets.

OBJECTS AND SUMMARY OF THE INVENTION

The present invention is made in order to eliminate the above-mentioned disadvantages accompanying conventional pellet production apparatus, and makes it an object to provide an improved pellet production apparatus capable of mass-producing pellets of desired size without being influenced by the screw rotation speed of an extruder which feeds pellet material to the pellet production apparatus.

Another object of the present invention is to add to such an improved pellet production apparatus a function to operate free also from both the viscosity of the pellet material and the inner pressure of the material feeding extruder.

To achieve the above objects, an apparatus according to the present invention consists basically of a stationary hollow cylindrical sheath having a large number of orifices as nozzles and of a cylindrical rotor having lengthwise surface grooves, a coaxially bored compressed-air introducing path, a plurality of radially directed air blow holes provided at ridge portions formed as a result of the provision of the above lengthwise surface grooves and a driving mechanism for rotating the cylindrical rotor, the above radially directed air blow holes communicating with the above coaxially bored compressed-air introducing path. With the thus constituted pellet production apparatus attached to the material extrusion end of an extruder with the cylindrical rotor kept coaxial with the screw of the extruder, a pellet material pushed into the pellet production apparatus from the extruder is transferred along the grooves of the rotor, pushed out from the orifices provided on the sheath, cut out to form pellets by the edges of the above mentioned ridge portions as the rotor rotates. The thus formed pellets are blown out by the compressed air supplied through the radially directed air blow holes.

According to the present invention, because the rotor is not connected to the screw of a material feeding extruder, but driven by a separate driving mechanism independently of the rotation of the screw of the extruder, the rotation speed of the rotor can be independently controlled so as to produce pellets of a desired length, irrespective of a pellet material feeding speed that depends on the inner pressure and screw rotation speed of the extruder and on the viscosity of the material.

BRIEF DESCRIPTION OF THE DRAWINGS

In the following the present invention is described in further detail in reference to the accompanying drawings, in which.

DETAILED DESCRIPTION OF THE INVENTION

Figure 1:
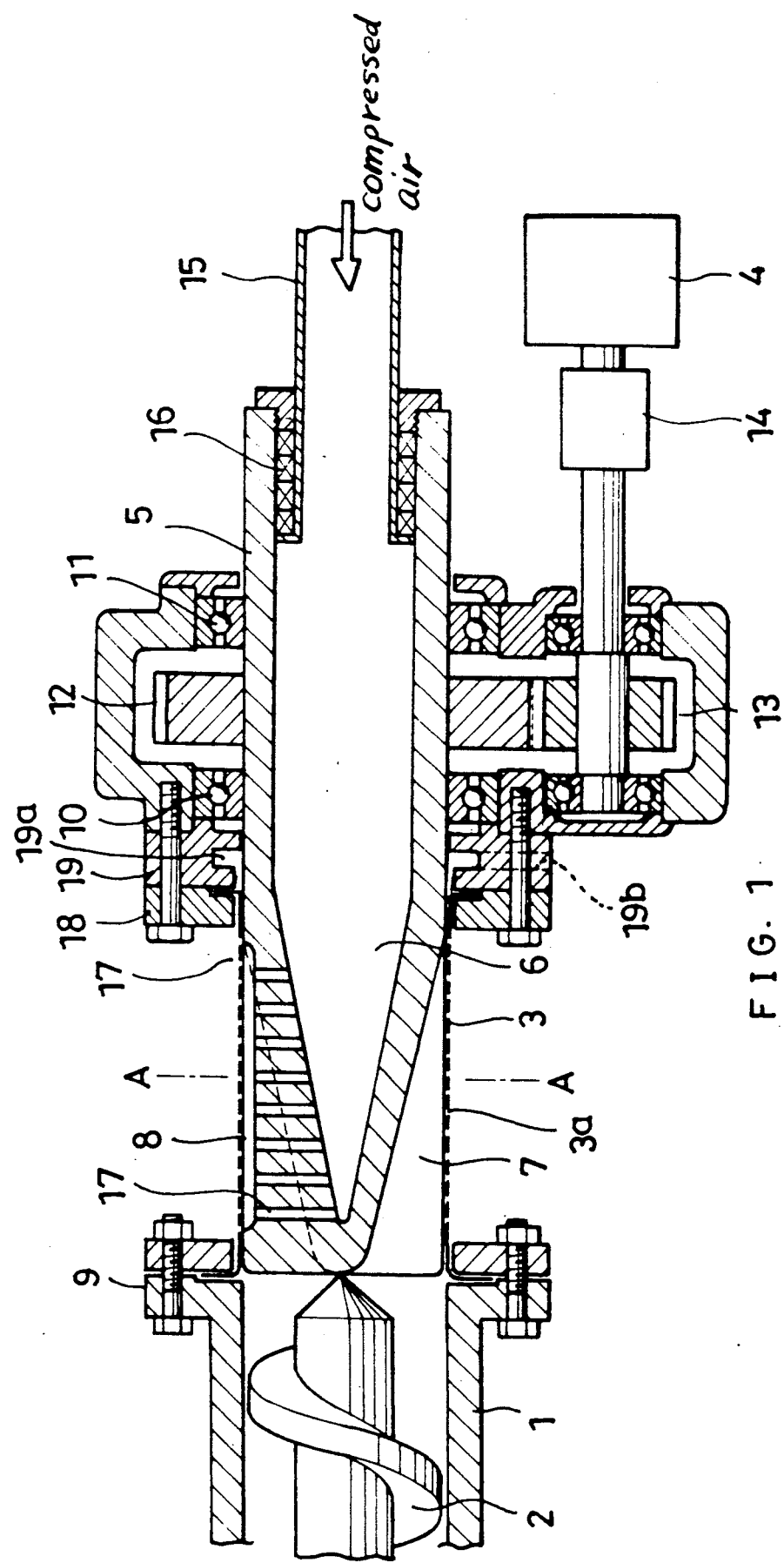
FIG. 1 shows lengthwise cross-sectionally an embodiment of the present invention as applied to an extruder.

Referring to FIG. 1, which shows a cross-sectional view of an embodiment of the invention as applied to an extruder, a mantle cylinder 1 and a screw 2 represent the extrusion end portion of the extruder to which the present embodiment is applied, while the pellet production apparatus according to the invention consists fundamentally of a multi-perforated hollow cylinder 3, a cylindrical rotor 5 provided with tapered grooves 7 etc. and a rotor driving mechanism comprising two bearings 10, 11, a pair of gears 12, 13, a motor 4 and a shaft connector 14 through which a rotor driving force is transmitted to the gear 13 from the motor 4.

Figure 2:
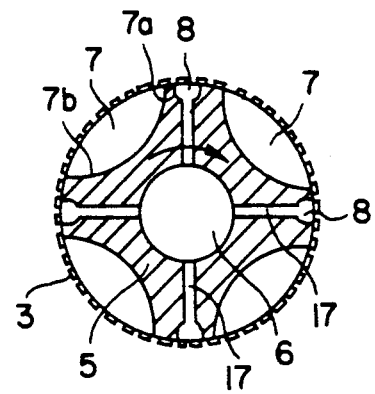
FIG. 2 shows the cross-sectional view taken along line A—A of FIG. 1.

In such a fundamental constitution the multi-perforated hollow cylinder 3 has its cylindrical wall provided with a large number of orifices 3a acting as nozzles, and has its one end fixed to the flange 9 at the outlet of the extruder mantle cylinder 1. The other end of the multi-perforated hollow cylinder 3 is hold by a pair of ring members 18 and 19. The ring member 18 is fixed through a support (not shown) to a machine base (not shown) or the ground, while the ring member 19 is provided with a groove 19a and a material leakage discharge hole 19b. On the other hand, the cylindrical rotor 5, in which is bored along its axis a compressed-air introducing path 6, has its one end portion directed toward the extruder screw 2, inserted in the multi-perforated sheath 3 and provided with first grooves 7, second grooves 8 and radially directed air-blow through holes 17 communicating between the second groove 8 and the compressed-air introducing path 6. The first grooves 7 are tapered so as to be made deeper toward the extruder with the groove ends made open thereto to accept a pellet material and so as to be made shallower in the opposite direction, vanishing at the position corresponding to the outside end where the multi-perforated hollow sheath 3 is held by the ring members 18 and 19. The second grooves 8 are made flat and shallow with their end not made open to the extruder. The first grooves 7 and the second groove 8 are disposed alternately on the periphery of the cylindrical rotor 5. At the open end of the compressed-air introducing path 6 there is inserted, with slidably air-tight seals 16 interposed, a compressed-air pipe 15 bridging the path 16 and a compressed-air source (not shown). Further, the cross-section of the first grooves 7 is not symmetrical, as is shown in FIG. 2 which shows the cross-sectional view taken along line A—A of FIG. 1. Referring to FIG. 2 the curvature of curves profiling the cross-section of grooves 7 is made larger in the rotating direction (indicated by a curved dart) of the rotor 5, as is shown by reference signs 7a and 7b. According to such cross-sectional profiles of the grooves 7, the pellet material existing at smaller curvature regions 7b is pressed over a wide range toward the multi-perforated sheath 3 in the process of the rotation of the rotor 5.

Figure 3:
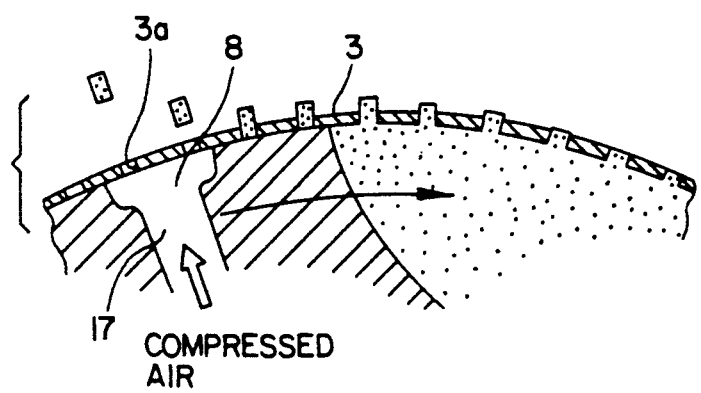
FIG. 3 illustrates the function of the present invention.

With the apparatus constituted as described above, a pellet material extruded from the extruder is pushed into the first grooves 7 and then pushed out from the orifices 3a of the multi-perforated sheath 3. The material pushed out from the orifices 3a is cut out to form pellets, as the rotor 5 rotates, by the ridge portions formed between the first and the second grooves 7 and 8. The pellets, which may stick in the orifices 3a just after formed, are blown out by the compressed air supplied through the air-blow through holes 17, as is illustrated by FIG. 3 which shows an enlarged partial cross-sectional view of the present apparatus. In the above process of pellet production, a small amount of pellet material that failed to be pushed out from the orifice 3a of the sheath 3 leaks into the groove 19a of the ring member 19 through a thin clearance undesirably left between the inner periphery of the sheath end portion and the outer periphery of the rotor 5, and then discharged out through the material leakage discharge hole 19b.

According to the present invention, as is easily understood from the above description, the length of produced pellets can be determined at will by controlling the rotation speed of the rotor 5 in accordance with the viscosity of the material, the inner pressure and screw rotation speed of the extruder.

Incidentally, the multi-perforated hollow cylindrical sheath 3 is preferably made of a material having a high tensile strength, such as a stainless steel and a titanium based alloy. Further, the first grooves 7 may be made not only tapered but also screw-shaped. In this case the second grooves 8, which are not tapered, are also made screw-shaped in accordance with the screw shape of the first grooves 7.

Figure 4:
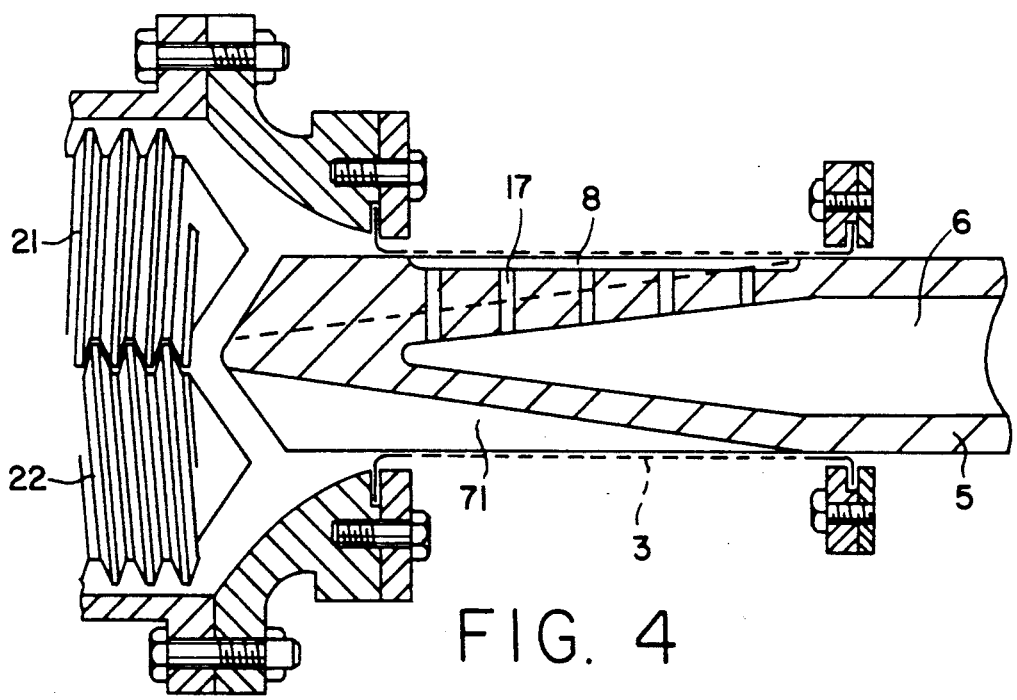
FIG. 4 shows a lengthwise cross-sectional view of another embodiment of the present invention.

FIG. 4 shows another embodiment modified so as to be suitable to be applied to a biaxial or two-screw extruder. In this embodiment the rotor 5 has its end portion prolonged so as to be inserted between two screws 21 and 22 of the extruder, and grooves 71 (which correspond to the grooves 7 in the preceding embodiment) are made not straight but screw-shaped to make it easy to take in a pellet material.

The present invention can be embodied also by making both the multi-perforated sheath and the rotor slightly tapered so as to be smaller in diameter toward the extruder at a tapering ratio of 1/100 to 2/100. In such an embodiment, the wear of the sheath and the rotor can be lessened by adjusting the relative position between both the elements along the common axis with a suitable adusting mechanism added to the apparatus.

Further, in case the close fitting between the multi-perforated sheath and the rotor may be spoiled because the sheath is made to bulge by a high feedihg pressure of the pellet material, the sheath may be finished so that its unaffected inner diameter may be somewhat larger than the outer diameter of the rotor.

I claim:

1. A pellet production apparatus to be attached to an extruder for feeding a pellet production material to said apparatus, said apparatus comprising:

a stationary multi-perforated hollow cylindrical sheath (3) provided on its cylindrical wall with a plurality of orifices (3a) acting as nozzles, said sheath (3) being fixed to the extrusion end of said extruder so as to accept thereinto said pellet production material fed from said extruder;

a cylindrical rotor (5) rotatably closely inserted over a predetermined length into said sheath (3) with one end directed toward said extruder, said rotor (5) having a compressed-air intake path (6) for accepting compressed air therein bored along the central axis of said rotor (5), first lengthwise surface-grooves (7) with their bottoms tapered toward said extruder, second lengthwise surface-grooves (8) with their bottoms kept parallel to the central axis of said rotor (5) and radially directed air-blow paths (17) communicating between said compressed-air intake path (6) and said second lengthwise surfaces-grooves (8), said first lengthwise surface grooves (7) and said second lengthwise surface grooves (8) being disposed alternately on the periphery of said rotor (5); and a rotor driving means (10, 11, 12, 13, 4) for rotating said rotor (5), whereby said pellet production material fed from said extruder is pushed out from said orifices (3a) through said first lengthwise surface grooves (7) and made to form pellets by being intermittently interrupted from being pushed out from said orifice (3a), as said cylindrical rotor (5) rotates, by ridge portions formed between said first lengthwise surface grooves (7) and said second lengthwise surface grooves (8), and whereby said pellets formed at said orifices (3a) are removed therefrom by being pushed out by compressed air from said compressed-air intake path (6) when said second lengthwise surface grooves (8) are positionally aligned with the orifices (3a) to which the formed pellets stick.

* * * * *